UNITED STATES PATENT OFFICE.

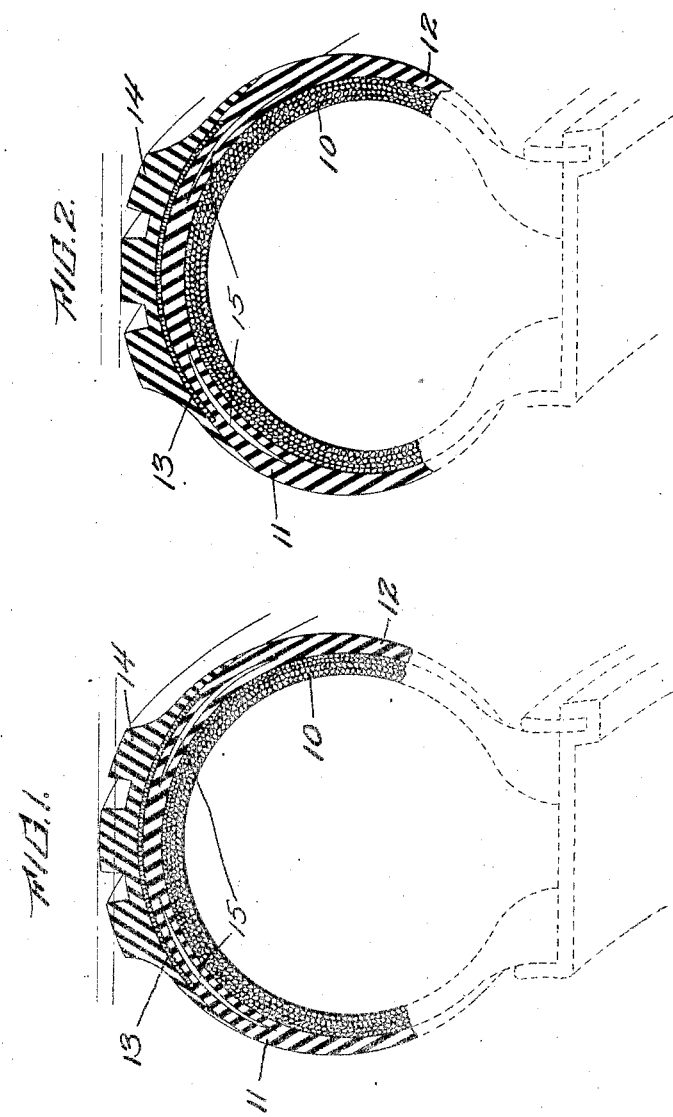

BURGESS DARROW, OF AKRON, OHIO, ASSIGNOR TO THE GOODYEAR TIRE & RUBBER COMPANY, OF AKRON, OHIO, A CORPORATION OF OHIO.

METHOD OF MANUFACTURING PNEUMATIC-TIRE TREADS.

1,367,180.  Specification of Letters Patent.  Patented Feb. 1, 1921.

Original application filed March 6, 1918, Serial No. 220,753. Divided and this application filed February 10, 1919. Serial No. 276,109.

*To all whom it may concern:*

Be it known that I, BURGESS DARROW, a citizen of the United States, residing at Akron, in the county of Summit and State of Ohio, have invented new and useful Improvements in Methods of Manufacturing Pneumatic-Tire Treads, of which the following is a specification.

My present invention relates to pneumatic tires and has for its general object the production of a pneumatic tire wherein the liability of premature destruction through separation of the tread and fabric carcass is efficiently guarded against.

This application is a true and legal division of my application, Serial No. 220,753, dated March 6, 1918.

The prevalent practice in the manufacture of a pneumatic tire involves the essential steps of building the fabric "carcass"; applying the covering strips of rubber, which form the "side walls", "cushion" and "tread", (the breaker strip being applied in with the cushion); and curing.

When a pneumatic tire is under load a change in the carcass cross-sectional contour is produced and this changed contour varies constantly in each portion of the tire as bumps, ruts, etc., are encountered and passed over.

One of the results of this change in contour is a shearing action between the tread strip and fabric carcass. The shearing action of a pneumatic tire under load is most acute in the zones which are located at the outer portions of the side walls and include the edges of the breaker strip.

This shearing action between the tread and cushion frequently starts a crack adjacent the edge of the breaker, which gradually results in the failure of the tire through destruction of the union between the tread and carcass.

It is the function of the cushion strip in a pneumatic tire to guard against disunion or separation between the tread and carcass by taking up through its elasticity, the shearing action between these elements.

However, while the cushion is usually sufficiently elastic to take up by stretching and without rupture, the shearing action between the fabric and the tread in all other portions of the carcass, it very frequently happens that elasticity of the cushion is not sufficient to take up, in the zones at the outer portions of the side walls, the shearing action resulting from unusual and sudden distortion when the car is overloaded and an unusually severe shock is sustained.

When such a shock comes, the cushion is, by the shearing action, stretched in the zone of the breaker strip edge beyond its limit of elasticity and a breaking of the union between the tread and carcass occurs. This rupture develops as the tire continues in service and causes tread separation.

As a means for overcoming the foregoing difficulties and rendering the tire less liable to tread separation, I propose by my present invention to adopt the following expedient:

The painting of the fabric carcass or the cushion in the zone of the breaker strip edge with graphite, soapstone, or the use of any other expedient which will prevent the cushion and tread from forming a union in this zone during the cure.

Constructing a tire in this manner will permit the tread and carcass to freely move relatively to each other under the shearing action and no rupture can result since no union exists to be broken.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention, and throughout the several views of which, similar reference numbers designate corresponding parts:

Figure 1 is a cross section of a pneumatic tire shown more or less in diagrammatic form and illustrating the manner in which the union between the cushion strip and the carcass is interrupted in the zone comprehending the edge of the breaker strip; and Fig. 2 is a similar view showing the tire flexed.

In illustrating my invention I have shown a tire of a frequently encountered type, known as a straight side-cord tire, but I do not wish to be limited to this particular type, as my invention can be applied to almost any tire of the pneumatic type.

In the drawings the numeral 10 designates the carcass proper, (which is formed, of course, of a plurality of cord sheets or layers); 11 designates the tread cushion; 12 the side walls; 13 the breaker strip, and 14 the tread strip or slab.

After the carcass has been built up in any suitable manner from plies of fabric, a gum strip or thin sheet of rubber is applied to the outer surface, extending from the valley of one bead to the valley of the other. Suitable side wall covering strips of rubber applied either in slab form or in small strips, are next put in position and the tire is then ready to receive the cushion strip.

Relatively narrow zones upon the surface of the now rubber coated fabric carcass are then painted or otherwise equivalently treated with soapstone or any other material which will prevent the cushion strip from uniting with the carcass when the tire is cured. These zones are located as indicated in the drawing at the outer part of each side wall and in most tires should be situated to comprehend the edge of the breaker strip 13. The cushion strip is then placed centrally on the crown of the tire and then stitched down upon the carcass in the usual manner.

In this connection it should be explained that the width of this zone will vary according to the size of the tire, but the proportions in most instances will be found to make a zone of approximately the dimensions indicated in Fig. 1. After the cushion strip is placed in position over the fabric carcass thus treated, the tread is applied and the tire then cured in a mold, in a wrap or on an air bag, according to which method of curing is to be followed in finishing the type of tire being built.

In the following claims I use the term "tread portion" to indicate broadly the cushion, breaker strip and tread slab or strip (which latter I have in some instances designated as the "tread proper").

Although I prefer, in view of the results of the experiments thus far completed, to paint or equivalently treat the rubber cover of the fabric carcass, I desire it understood that I also contemplate by my present invention the painting of the cushion or the tread slab.

What I claim is:

1. The method of constructing pneumatic automobile tire casings which consists in painting or otherwise treating the tire carcass in zones located approximately at the junction of the tread and sidewalls, to prevent the forming during the curing process of either direct or indirect union between the tread portion and the carcass in such zones, and subsequently curing the tire.

2. The method of constructing pneumatic automobile tire casings which consists in applying a film of non-vulcanizable material such as graphite, soapstone or varnish to the tire carcass in zones located approximately at the junction of the tread and sidewalls, to prevent the forming during cure of either a direct or indirect union between the tread portion and the carcass in such zones, and subsequently curing the tire.

3. The method of constructing automobile tire casings which consists in applying a thin sheet of rubber to the major portion of the exterior of the tire carcass, painting or otherwise treating the exterior of said sheet of rubber in zones located approximately at the junction of the tread and sidewalls to prevent the forming of either direct or indirect union between the tread and the carcass in such zones, and subsequently curing the tire.

4. The method of constructing automobile tire casings which consists in the following steps; first, building a carcass; second, applying a thin sheet of rubber to the carcass for the major portion of its exterior, painting or otherwise treating with a non-vulcanizable material the exterior of said rubber cover, in zones located at the approximate junction of the central third with the lateral two-thirds of the carcass; third, applying a cushion stock over the said rubber cover; fourth, applying a breaker strip to the said cushion; fifth, applying a tread slab and sidewalls to completely incase the carcass from bead to bead; and finally vulcanizing the tire.

5. The method of constructing pneumatic tire casings which consists in treating portions of the side walls of an uncured tire carcass in zones adjacent the tread portions of the tire in such manner as to prevent a union between the treated portions of the tire in such zones, and subsequently curing the tire carcass.

6. The method of constructing a pneumatic tire casing which consists in covering portions of the uncured tire with a lubricating material, wholly inclosing the portions so covered by subsequent layers of vulcanizable material, and curing the tire.

7. The method of constructing a pneumatic tire casing which consists in painting the portions of the uncured tire with a non-vulcanizable material, wholly inclosing the painted portions by subsequent layers of vulcanizable material, and curing the tire.

In testimony whereof I have hereunto signed my name in the presence of two subscribing witnesses.

BURGESS DARROW.

Witnesses:
L. M. HARTMAN,
R. S. TROGNER.